E. H. MESSITER.
UNIVERSAL JOINT.
APPLICATION FILED APR. 4, 1910.
993,701.
Patented May 30, 1911.
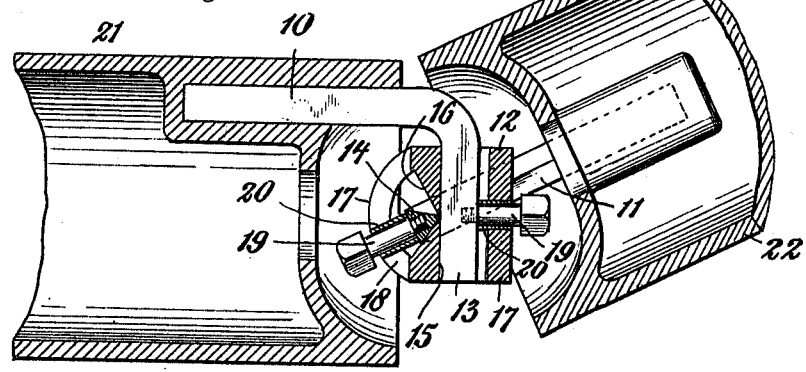
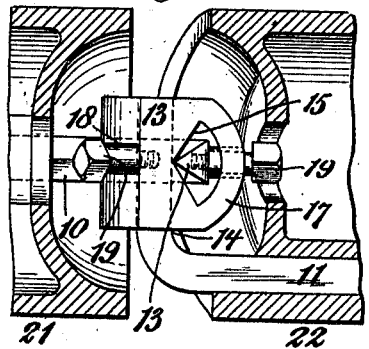
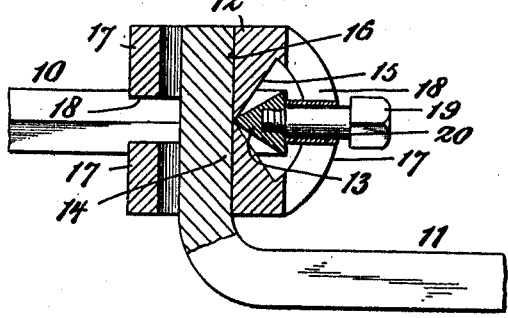
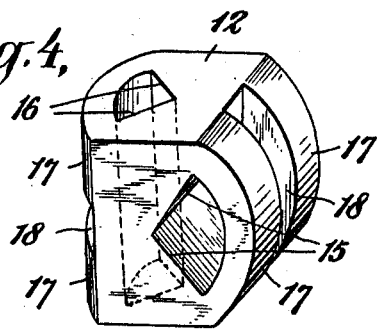
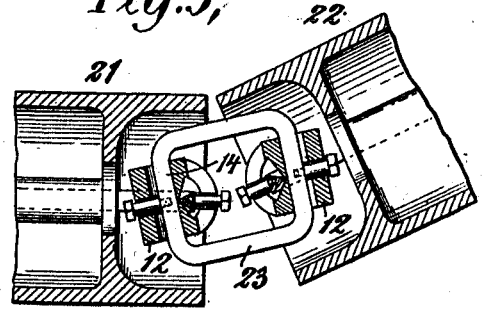
WITNESSES:
INVENTOR
BY
ATTORNEYS

UNITED STATES PATENT OFFICE.

EDWIN H. MESSITER, OF BROOKLYN, NEW YORK.

UNIVERSAL JOINT.

993,701.  Specification of Letters Patent.  Patented May 30, 1911.

Application filed April 4, 1910. Serial No. 553,342.

*To all whom it may concern:*

Be it known that I, EDWIN H. MESSITER, a citizen of the United States of America, and a resident of Brooklyn, county of Kings, and State of New York, have invented certain new and useful Improvements in Universal Joints, of which the following is a specification, reference being had to the accompanying drawings, forming a part thereof.

My invention relates to improvements in universal joints, and particularly to universal joints adapted to be employed under longitudinal tension, and the main object of my invention is to reduce to a minimum the friction between the moving parts thereof when revolving under such longitudinal tension. Such a joint is particularly useful for connecting the angularly disposed members of suspensively supported conveyer belt idler pulleys. This form of pulley is a desirable one owing to the reduction of the supporting bearings employed, one only being required at each end thereof, and the accessibility thereof, but these advantages are somewhat offset where a universal joint is employed for connecting them, which itself is subjected to considerable wear. A joint constructed in accordance with my present invention avoids this difficulty, for the friction therein being reduced to substantially nothing, there is practically no wear upon the parts.

My invention consists in a universal joint having rotatable members provided with oppositely disposed intersecting knife edge bearing portions preferably arranged ninety degrees apart, and a floating bearing block having oppositely disposed bearing surfaces, conveniently of V-shape, for respective engagement therewith.

My invention also consists in a means in combination with the foregoing for preventing movements of the knife edge portions longitudinally along their respective bearing grooves, and in certain novel features of construction and combinations of parts to be presently described, and in order that my invention may be thoroughly understood, I will now proceed to describe an embodiment thereof, having reference to the accompanying drawings illustrating the same, and will then point out the novel features in claims.

In the drawings: Figure 1 is a view in central longitudinal section through a universal joint constructed in accordance with my invention, showing the same as connecting two angularly disposed belt conveyer idler pulley members. Fig. 2 is a view in side elevation of the joint and in longitudinal section through the pulley members, the point of view being taken at right angles to the point of view of Fig. 1. Fig. 3 is a detail sectional view of the universal joint upon an enlarged scale. Fig. 4 is a detail perspective view of one form of the floating bearing block employed. Fig. 5 is a detail sectional view showing two of the joints as employed for connecting the pulley members together.

The universal joint, as a whole, comprises two rotatable members 10 and 11 adapted to be angularly disposed with intersecting axes, and a floating supporting block 12 between them. Each of the members 10 and 11 includes a knife edge portion 14 disposed at right angles to the axis of rotation thereof and facing inward in the longitudinal direction of such axis of rotation. The two members 13 and 14 are arranged to hook over each other, being preferably disposed angularly ninety degrees apart and with their edges in substantial engagement at the point of intersection of the axes of rotation of the members, all as will be well understood by reference to the drawings. It will be understood that the desired and ideal condition of the parts is with the knife edges of the two members 13 and 14 actually meeting and that such point of meeting shall be exactly the point of intersection between the axes of rotation of the parts carrying them. Any extensive variation from this condition would cause frictional movement between the parts which is otherwise obviated, but it will of course be understood that slight variations from this condition readily occur in practical use and hence to define a condition wherein these knife edges actually meet at such a point, or so nearly meet that the friction resulting from their failure to actually meet is negligible for practical purposes, I have employed the expression "substantially meeting" in the claims, and in the use of such expression I wish to be understood as defining a condition wherein the parts do not substantially depart from a point of actually meeting and that this point shall not substantially depart from the point of intersection of the axes of the rotatable members. The float-
ing bearing block 12, in the form shown, is provided with two V-shaped bearing portions 15 and 16 for co-engagement with the knife edges 13 and 14 respectively, the said bearing portions facing in opposite directions and being disposed angularly ninety degrees apart. The block is thus held against movement in the plane of either of the knife edges but may move freely in a direction transverse to such plane, it being understood that the angle of approach to the bearing line is greater than the angle of the knife edge portion so that the knife edge portion may rock backward and forward laterally in the said bearing groove. It will be readily understood that such a joint will support considerable longitudinal stress without any friction occurring in the rotation of the parts, because the movement of the parts will be rocking ones between the knife edges and the bearing portions, only.

In order to prevent the parts moving relatively in a direction at right angles to their rocking movements, I conveniently provide the floating block 12 upon either side thereof, in proximity to the oppositely disposed V-shaped bearing grooves, with flanges 17, between which there is a transverse slot 18 for receiving a guide pin 19. Each of the knife edge portions is provided with such a pin 19 which is received within the slot 18 between a pair of the flanges 17 upon the corresponding side of the said block, the flanges 17 upon opposite sides of the said block being arranged angularly 90° apart, whereby on each side they are at right angles to the longitudinal plane of the rocking axis at that side. Such an arrangement provides a means for preventing lateral displacement of the parts, i. e., any movement of the knife edge portions longitudinally with respect to the V-shaped bearing groove with which such part is in engagement, but as any tendency to get out of line is an abnormal one, it follows that such an engagement is unusual and the amount of friction between the bearing and the flanges is hence substantially negligible. Furthermore, an antifriction roller 20 may, if desired, be employed around the pin 19, such as will tend to further decrease the friction at this point.

In the drawings I have shown this joint as connected with members 21—22 of a conveyer belt idler pulley. The joint is particularly adapted for this purpose because it will stand longitudinal stress without causing any substantial amount of friction to be introduced, so that suspensively employed pulleys may be practically employed, it being also understood that as the members of such pulleys are driven by the belt, there is substantially no driving torque between the elements of the joint.

Because of the fact that the angular velocity of the two joint elements varies relatively, at various positions of the joint, I have in Fig. 5 shown a form in which two of such joints are employed with corresponding elements oppositely disposed, whereby such relative variation of speed is corrected and the two pulley members are caused to move synchronously throughout their entire revolution. In such case the knife edge portions upon the adjacent sides of the two joints may be formed as a continuous link 23, this being a simple, inexpensive, strong, and durable form in which to construct the parts, as will be readily understood by reference to Fig. 5.

What I claim is:

1. A universal joint having rotatable members arranged to be disposed with their axes intersecting each other at a point, the said members being provided with oppositely disposed transverse knife-edge bearing portions arranged across each other and substantially meeting at the said point of axial intersection, and a floating bearing block having oppositely disposed bearing surfaces for respective engagement with the said knife edge portions.

2. A universal joint having rotatable members arranged to be disposed with their axes intersecting each other at a point, the said members being provided with oppositely disposed transverse knife-edge bearing portions arranged across each other and substantially meeting at the said point of axial intersection, and a bearing block having oppositely disposed V-shaped bearing grooves for respective engagement with the said knife edge portions.

3. A universal joint comprising two rotatable elements arranged to be disposed with their axes intersecting each other at a point, each of the said elements being provided with a knife edge portion disposed at substantially a right angle with respect to its axis of rotation and facing inwardly in the direction of the length thereof, the knife edges of the two said elements being disposed transversely across each other in hooked relation and arranged to substantially meet at the said point of axial intersection, and a floating bearing block having oppositely disposed bearing surfaces for respective engagement with the said knife edges.

4. A universal joint comprising two rotatable elements arranged to be disposed with their axes intersecting each other at a point, each of the said elements being provided with a knife edge portion disposed at substantially a right angle with respect to its axis of rotation and facing inwardly in the direction of the length thereof, the knife edges of the two said elements being disposed transversely across each other at substantially right angles, and arranged to substantially meet at the said point of axial intersection, and a bearing block having two oppositely disposed V-shaped bearing grooves, disposed at substantially right angles to each other, for respective engagement with the said knife edges.

5. A universal joint having relatively rotatable members arranged to be disposed with their axes intersecting each other at a point, the said members being provided with oppositely disposed transverse knife-edge bearing portions arranged across each other and substantially meeting at the said point of axial intersection, a floating bearing block having oppositely disposed bearing surfaces for respective engagement with the said knife edge portions, and means for preventing relative movement of the said knife edge portions with respect to the block in a direction lengthwise with respect to the bearing surfaces thereof.

6. A universal joint having relatively rotatable members arranged to be disposed with their axes intersecting each other at a point, the said members being provided with oppositely disposed transverse knife-edge bearing portions arranged across each other and substantially meeting at the said point of axial intersection, a bearing block having oppositely disposed V-shaped bearing grooves for respective engagement with the said knife edge portions, and means for preventing relative movement of the said knife edge portions with respect to the block in a direction lengthwise with respect to the bearing surfaces thereof.

7. A universal joint comprising two rotatable elements arranged to be disposed with their axes intersecting each other at a point, each of the said elements being provided with a knife edge portion disposed at substantially a right angle with respect to its axis of rotation and facing inwardly in the direction of the length thereof, the knife edges of the two said elements being disposed transversely across each other and arranged to substantially meet at the said point of axial intersection, a floating bearing block having oppositely disposed bearing surfaces for respective engagement with the said knife edges, and means for preventing relative movement of the said knife edge portions with respect to the block in a direction lengthwise with respect to the bearing surfaces thereof.

8. A universal joint comprising two rotatable elements arranged to be disposed with their axes intersecting each other at a point, each of the said elements being provided with a knife edge portion disposed at substantially a right angle with respect to its axis of rotation and facing inwardly in the direction of the length thereof, the knife edges of the two said elements being disposed transversely across each other at substantially right angles, and arranged to substantially meet at the said point of axial intersection, a bearing block having two oppositely disposed V-shaped bearing grooves, disposed at substantially right angles to each other, for respective engagement with the said knife edges, and means for preventing relative movement of the said knife edge portions with respect to the block in a direction lengthwise with respect to the bearing edges thereof.

9. A universal joint having relatively rotatable members arranged to be disposed with their axes intersecting each other at a point, the said members being provided with oppositely disposed transverse knife-edge bearing portions arranged across each other and to substantially meet at the said point of axial intersection, a floating bearing block having oppositely disposed bearing surfaces for respective engagement with the said knife edge portions, and lateral guides at right angles to the line of engagement of the knife edges upon the same side of the block, the said knife-edge portions being provided with projections for engagement with the said guides.

10. The combination with rotatable pulley members having intersecting axes, of two universal joints connecting them, each of the universal joints including transversely disposed knife edge bearing portions arranged to cross each other, and floating bearing blocks for respective engagement with each pair of knife edge portions, the contiguous knife edge portions of the two joints being formed in the same plane and comprising a continuous link.

EDWIN H. MESSITER.

Witnesses:
 D. HOWARD HAYWOOD,
 LYMAN S. ANDREWS, Jr.

Copies of this patent may be obtained for five cents each, by addressing the "Commissioner of Patents, Washington, D. C."